(12) United States Patent  
Roo

(10) Patent No.: US 6,397,088 B1
(45) Date of Patent: May 28, 2002

(54) LOCATION SEARCH AUXILIARY SYSTEM FOR CELLULAR RADIO TELEPHONE AND METHOD FOR USING SAME

(75) Inventor: Kyung-Yun Roo, Kumi-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/374,022

(22) Filed: Aug. 13, 1999

(30) Foreign Application Priority Data

Sep. 15, 1998 (KR) .............................................. 98-37977

(51) Int. Cl.⁷ .............................. H04B 1/38; H04M 1/00
(52) U.S. Cl. ........................ 455/572; 455/404; 455/567; 455/573
(58) Field of Search ................................. 455/404, 410, 455/456, 550, 567, 572, 573, 574, 575, 127

(56) References Cited

U.S. PATENT DOCUMENTS

| 5,646,977 | A | * | 7/1997 | Koizumi | ..................... 455/572 |
| 5,805,998 | A | * | 9/1998 | Kodama | ..................... 455/462 |
| 5,857,148 | A | * | 1/1999 | Weisshappel et al. | ........ 455/572 |
| 5,862,472 | A | * | 1/1999 | Park | ........................... 455/411 |
| 5,926,090 | A | * | 7/1999 | Taylor et al. | ............ 340/568.1 |
| 6,075,456 | A | * | 6/2000 | Park | ....................... 340/825.44 |
| 6,118,979 | A | * | 9/2000 | Powell | ....................... 455/31.2 |

* cited by examiner

Primary Examiner—Edward F. Urban
Assistant Examiner—Temica M. Davis
(74) Attorney, Agent, or Firm—Dilworth & Barrese, LLP

(57) ABSTRACT

A location search auxiliary system used in a cellular radio telephone. The location search auxiliary system includes an auxiliary battery and a search signal receiver. If the cellular radio telephone is not equipped with a main battery or if the main battery mounted therein is substantially discharged, the search signal receiver is operated by power from the auxiliary battery. If a search signal is transmitted to the search signal receiver, the cellular radio telephone generates an alarm tone or a voice message indicating that it is a missing telephone.

14 Claims, 2 Drawing Sheets

LOCATION SEARCH AUXILIARY SYSTEM FOR CELLULAR RADIO TELEPHONE AND METHOD FOR USING SAME

CLAIM OF PRIORITY

This application makes reference to, incorporates the same herein, and claims all benefits accruing under 35 U.S.C. §119 from an application entitled LOCATION SEARCH AUXILIARY SYSTEM FOR CELLULAR RADIO TELEPHONE earlier filed in the Korean Industrial Property Office on Sep. 15, 1998, and there duly assigned Serial No. 98-37977.

BACKGROUND OF THE INVENTION

1. Field of the Invention

The present invention relates to a location system for a radio communication terminal, and more particularly, to a location search auxiliary system to locate a lost or misplaced cellular radio telephone and a method for using the same.

2. Description of the Related Art

A cellular radio telephone, such as a handheld radio telephone or a smart telephone, is compact and therefore easily lost or misplaced as a result of its compactness. If the cellular radio telephone is missing, a user may dial his telephone number to help locate it, by listening for the ring tone. However, if the cellular radio telephone's battery is substantially discharged, or removed, it will not respond to a call from the user. Furthermore, if the cellular radio telephone's incoming call alert tone has been set to a mute mode, that is, vibration or lamp indication only, calling the telephone will not help to locate it.

SUMMARY OF THE INVENTION

It is therefore an object of the present invention to provide a location search auxiliary system to easily locate a cellular radio telephone which is lost or misplaced.

In accordance with one aspect of the present invention, a location search auxiliary system used in a cellular radio telephone includes: an auxiliary battery; a search signal receiver supplied by power from the auxiliary battery, for waiting until a search signal is received, and generating an alarm signal upon receiving the search signal; a power fail detector for detecting a power fail state when a main battery voltage drops below a prescribed level, said voltage being provided by a main battery which supplies an operating power to the cellular radio telephone; a first switch connected between the auxiliary battery and the search signal receiver and switched ON when the power fail state is detected, thereby supplying the power of the auxiliary battery to the search signal receiver; an emergency power supply for generating emergency power from the power of the auxiliary battery when it is connected to the auxiliary battery; a second switch connected between the output terminal of the first switch and the emergency power supply and switched ON by the alarm signal; a voice processor connected to the emergency power supply and to a speaker and operated when the emergency power is supplied, where the operating power of the main battery is not supplied; and a controller connected to the emergency power supply and operated when the emergency power is supplied, where the operating power of the main battery is not supplied, thereby generating an audible notification by driving the speaker via the voice processor in response to the alarm signal, where the audible notification is an alarm tone or a voice message indicating the telephone is lost or misplaced.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention is described hereinbelow, with reference to the accompanying drawings. In the following description, numerous specific details are set forth to provide a more thorough understanding of the present invention. It will be apparent, however, to one skilled in the art that the present invention may be practiced without these specific details. In other instances, well known constructions or functions are not described in detail so as not to obscure the present invention.

Figure 1:
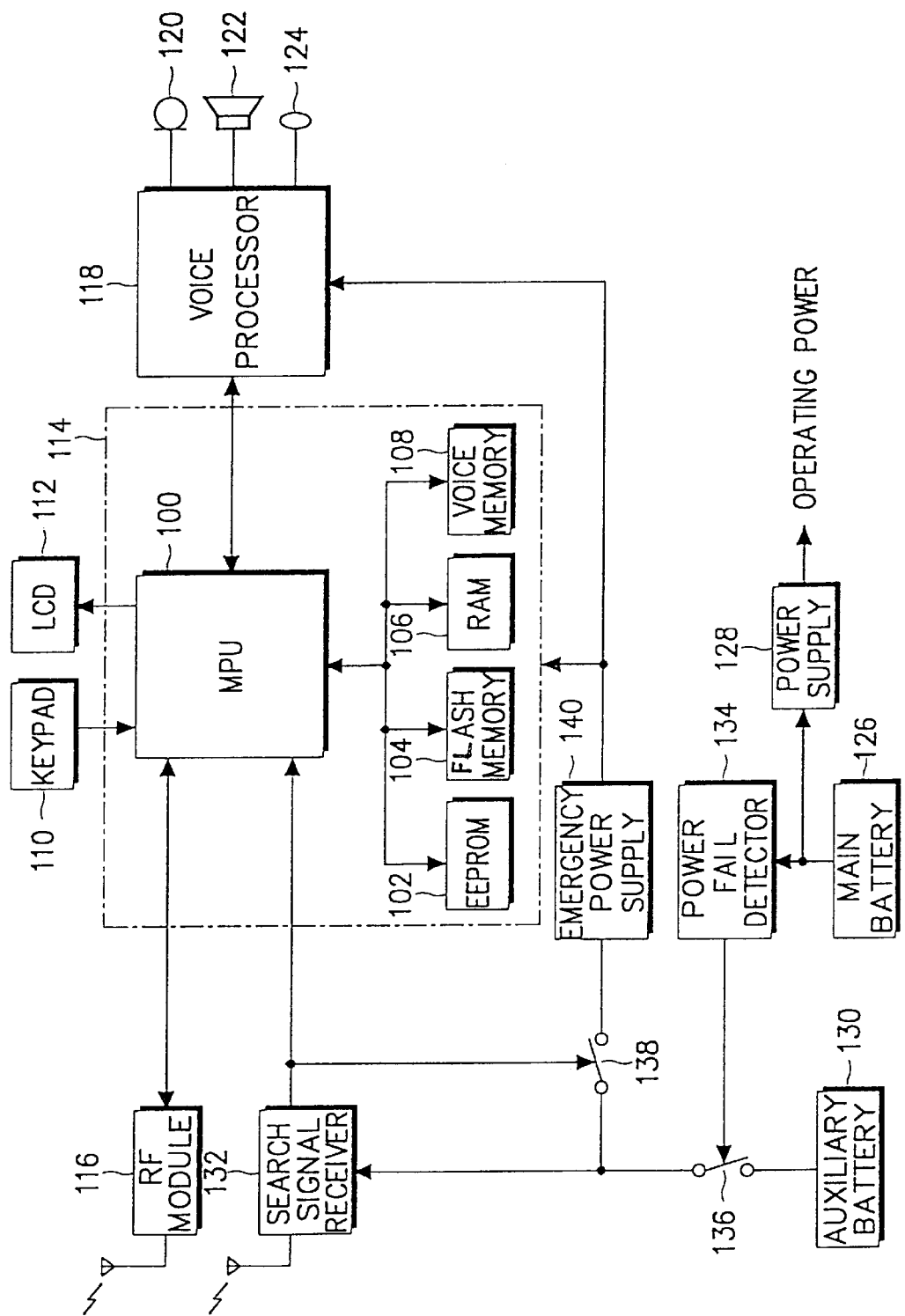
FIG. 1 is a block diagram of a cellular radio telephone including a location search auxiliary system according to a preferred embodiment of the present invention.

Referring to FIG. 1, an auxiliary battery 130, a search signal receiver 132, a power fail detector 134, first and second switches 136 and 138, and an emergency power supply 140 are additionally provided in the construction of a general cellular radio telephone. The search signal receiver 132 and a microprocessor unit (MPU) 100 of a controller 114 execute the operations shown in FIGS. 2 and 3, respectively.

The controller 114, which consists of the MPU 100, an EEPROM (Electrically Erasable and Programmable Read Only Memory) 102, a flash memory 104, a RAM (Random Access Memory) 106 and a voice memory 108, processes and controls the operation during a general phone call or data communication by the MPU 100 and processes the commands necessary to perform a location search for the cellular radio telephone. The operations required for the general phone call or data communication is known, and therefore details of the operations are omitted.

The EEPROM 102, flash memory 104, RAM 106 and voice memory 108 are accessed by the MPU 100 connected thereto. The EEPROM 102 stores reference data for the operation processed and controlled by the MPU 100. The flash memory 104 stores programs for the operation processed and controlled by the MPU 100. The RAM 106 is provided as a working memory of the MPU 100. The voice memory 108 stores voice data indicating that the cellular radio telephone has been lost or misplaced in accordance with the present invention. A keypad 110 and a display, preferably an LCD (Liquid Crystal Display) 112, are connected to the MPU 100. The keypad 110 has various keys, among them numeral keys, and supplies key entry data to the MPU 100 as it is entered by the user. The LCD 112 displays various images and is under the control of the MPU 100. A radio frequency (RF) module 116 modulates a signal received from the MPU 100 to transmit an RF signal through an antenna and demodulates the RF signal received through the antenna to transmit the demodulated signal to the MPU 100.

A voice processor 118 connected to the MPU 100, and a microphone 120, a speaker 122 and a vibrator 124 connected to the voice processor 118 are used to make a telephone call, voice recording, or incoming call alarm. The voice processor 118 encodes a voice signal received from the microphone 120 to transmit voice data to the MPU 100 and decodes the voice data received from the MPU 100 to transmit a voice signal to the speaker 122. The vibrator 124 vibrates the cellular radio telephone.

The controller 114, keypad 110, LCD 112, RF module 116 and voice processor 118 are powered by an operating power supplied from a main battery 126 which is generally mounted on the cellular radio telephone. The operating power generated from the main battery 126 is supplied to each part through a power supply 128.

If the cellular radio telephone is not equipped with the main battery or if the main battery mounted therein is substantially discharged, the conventional cellular radio telephone does not supply the operating power necessary to produce a ring tone and as a result the telephone will not respond to a call from a user attempting to locate it.

However, in the preferred embodiment of the present invention, the auxiliary battery 130 is provided to supply a power to minimum parts needed to search for the missing cellular radio telephone. In order to maintain the compactness of the cellular radio telephone, the auxiliary battery 130 is preferably small, resulting in a lower capacity. The search signal receiver 132, which consumes little power, responds to the reception of a search signal. The power of the auxiliary battery 130 is supplied to the search signal receiver 132, controller 114 and voice processor 118 only when the main battery 126 is removed or is substantially discharged. Conversely, if the cellular radio telephone is equipped with a charged main battery 126, the power of the auxiliary battery 130 is not used.

The power fail detector 134 determines when to use the auxiliary battery 130. The power fail detector 134 is connected to the output terminal of the main battery 126 together with the power supply 128 enabling it to receive power generated from the main battery 126. The power fail detector 134 detects a power fail state when the main battery's voltage drops below a prescribed level. If the main battery 126 is removed or if it is substantially discharged, the main battery's voltage will drop below the prescribed voltage level, causing a power fail state which is detected by the power fail detector 134, preferably using a voltage comparator.

The first switch 136 is connected to the output terminal of the auxiliary battery 130. The search signal receiver 132 and the second switch 138 are connected to the output terminal of the first switch 136. The output terminal of the second switch 138 is connected to the input terminal of the emergency power supply 140. The first switch 136 is switched ON when the power fail state is detected by the power fail detector win 134 and is otherwise switched OFF. Therefore, if the main battery 126 is removed or if it is substantially discharged, the power is supplied to the search signal receiver 132 through the first switch 136 from the auxiliary battery 130, thereby allowing normal operation of the search signal receiver 132.

If a radio signal of a preset code is received, the search signal receiver 132 senses that it is a self search signal and generates an alarm signal. The search signal receiver 132 uses an RF receiver similar to those in a remote starter used for starting a car. Preferably, the telephone number of the cellular radio telephone can be used as a unique code for the search signal. The search signal then becomes the radio signal of a code corresponding to the telephone number of the cellular radio telephone. This code may be changed. The alarm signal generated when the search signal receiver 132 receives the search signal becomes a logic "HIGH" or "LOW" signal. The search signal receiver 132 is operated when power is supplied through the first switch 136 from the auxiliary battery 130. Namely, the search signal receiver 132 is operated by the power supplied from the auxiliary battery 130 only when the main battery 126 is removed or it is substantially discharged.

Figure 2:
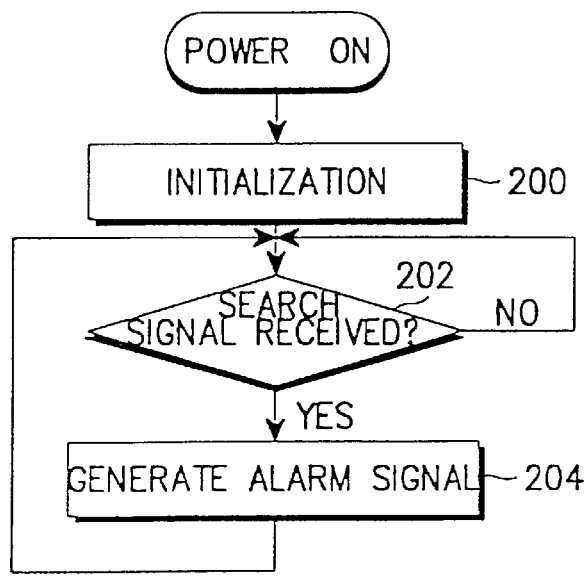
FIG. 2 is a flow chart illustrating a control operation of a search signal receiver shown in FIG. 1.

FIG. 2 is a flow chart illustrating a control operation of the search signal receiver 132. If power is supplied from the auxiliary battery 130, the search signal receiver 132 carries out an initialization procedure at step 200 and subsequently waits for receipt of the search signal at step 202. If the search signal is received, the search signal receiver 132 generates the alarm signal for a predetermined time period at step 204.

The alarm signal generated from the search signal receiver 132 is supplied to the second switch 138 and the MPU 100. The second switch 138 is switched ON by the alarm signal generated from the search signal receiver 132. If the second switch 138 is switched ON, power from the auxiliary battery 130 is supplied to the emergency power supply 140 through the first and second switches 136 and 138. The emergency power supply connected to the auxiliary battery 130 generates an emergency power. The emergency power is then used for operating the controller 114 and the voice processor 118 when the main battery 126 is removed or it is substantially discharged. Therefore, the emergency power replaces the operating power normally supplied from the power supply 128 to the controller 114 and to the voice processor 118.

Figure 3:
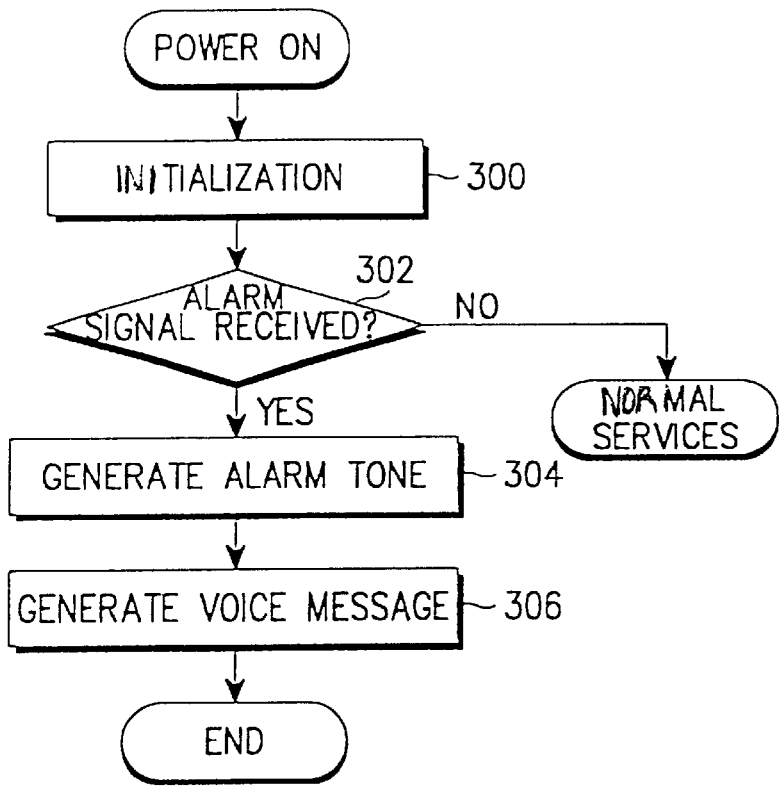
FIG. 3 is a flow chart illustrating a control operation of a MPU shown in FIG. 1.

FIG. 3 is a flow chart illustrating a control operation of the MPU 100. If the power is supplied from the auxiliary battery 130, the MPU 100 carries out an initialization procedure at step 300. At step 302, the MPU 100 checks whether the alarm signal is received from the search signal receiver 132. If the alarm signal is not received, the MPU 100 provides normal services. If the alarm signal is received, the MPU 100 drives the speaker 122 to generate an alarm tone by the voice processor 118 at step 304. The MPU 100 drives the speaker 122 via the voice processor 118 to generate a voice message stored in the voice memory 108 at step 306. The voice message may be a message representing that the cellular radio telephone has been lost or misplaced, for example, "THIS IS A MISSING TELEPHONE". Therefore, even if someone finds the telephone, it is easily ascertainable by the voice message that the telephone is one which is missing. Such a voice message may be recorded by the user through the microphone 120 or by the manufacturer. It is also contemplated that the message may be an alarm tone, beep, or buzzer, light or the like which may notify the owner of the telephone of its location.

Therefore, even if the missing cellular radio telephone has its battery substantially discharged or removed, it will still generate the alarm tone and the voice message upon receiving the search signal, enabling the user to locate his missing telephone.

In addition, in a preferred embodiment, the search signal receiver 132 generates the alarm signal only for a predetermined time period. After the predetermined time period has elapsed, the second switch 138 which has been switched ON when the search signal is received is again switched OFF. Similarly, the emergency power supply 140 is disconnected from the controller 114 and the voice processor 118, conserving the auxiliary battery 130. The predetermined time period is set to a time necessary for generating the alarm tone and the voice message. Therefore, the auxiliary battery's 130 power consumption is reduced due to the alarm tone and the voice message's duration being limited to the predetermined time period. That is, if the missing telephone is far away from the user so that he can't hear the alarm tone or the voice message, the auxiliary battery 130 can be prevented from being unnecessarily discharged.

As a result, the cellular radio telephone in which the inventive location search auxiliary system is installed generates the alarm tone and the voice message in response to the search signal even if it has its main battery substantially discharged or removed. Accordingly, the user can easily find his missing telephone. In such a case, the alarm tone and the voice message will be generated irrespective of an incoming call alert tone of the telephone.

While the invention has been shown and described with reference to a certain is preferred embodiment thereof, it will be understood by a person of ordinary skill in the art that the present invention is not limited to the specific embodiment illustrated above. For example, the cellular radio telephone may generate either the alarm tone or the voice message in response to the search signal. Therefore, the present invention should be understood to include all possible embodiments and modifications which do not depart from the spirit and scope of the invention as defined by the appended claims.

What is claimed is:

1. A location search auxiliary system used in a cellular radio telephone having a main battery to supply operating power to the cellular radio telephone, comprising:

an auxiliary battery;

a search signal receiver operated by power supplied from the auxiliary battery, to receive a search signal, and to generate an alarm signal for a predetermined time period;

a power fail detector for detecting a power fail state when the main battery voltage drops below a prescribed level;

a first switch connected between the auxiliary battery and the search signal receiver and switched ON when the power fail state is detected, to supply power from the auxiliary battery to the search signal receiver; and means for generating an indication of location of the telephone when the alarm signal is generated.

2. The location search auxiliary system as recited in claim 1, further comprising:

an emergency power supply connected to the auxiliary battery for generating emergency power using the power of the auxiliary battery;

a second switch connected between the first switch and the emergency power supply and switched ON by the alarm signal;

a voice processor connected to the emergency power supply and to a speaker and operated when the emergency power is supplied as a result of the main battery power being interrupted; and a controller connected to the emergency power supply and operated when the emergency power is supplied as a result of the interruption of main battery power, thereby providing the means for generating the location indicator in response to the alarm signal.

3. The location search auxiliary system as recited in claim 2, wherein the location indicator is an alarm tone such that the speaker is driven by the voice processor which receives a signal from the generating means.

4. The location search auxiliary system as recited in claim 2, wherein the location indicator is a voice message indicative of the telephone being lost or misplaced, such that the speaker is driven by the voice processor which receives a signal from the generating means.

5. The location search auxiliary system as recited in claim 3, wherein the search signal receiver generates the alarm signal only for a predetermined time period.

6. The location search auxiliary system as recited in claim 4, wherein the search signal receiver generates the alarm signal only for a predetermined time period.

7. A method for locating a cellular radio telephone using a location search auxiliary system, the method comprising the steps of:

connecting an auxiliary battery to a search signal receiver automatically when a main battery power level falls below a predetermined level;

detecting whether a search signal generated by a user of the cellular radio telephone is received or not;

switching the auxiliary battery to an emergency power supply when the search signal is detected; and generating an alarm signal.

8. A method for locating a cellular radio telephone as recited in claim 7, wherein the search signal is generated by dialing the telephone's number from another phone.

9. A method for locating a cellular radio telephone as recited in claim 7, wherein the location notification is an audible alarm generated by the telephone.

10. A method for locating a cellular radio telephone as recited in claim 7, wherein the location notification is a voice message indicating that the cellular radio telephone has been lost or misplaced.

11. A method for locating a cellular radio telephone as recited in claim 8, wherein the location notification is an alarm tone generated by the telephone.

12. A method for locating a cellular radio telephone as recited in claim 8, wherein the location notification is a voice message indicating that the cellular radio telephone has been lost or misplaced.

13. A method for locating a cellular radio telephone as recited in claim 8, wherein the location notification is a visible signal generated by the telephone.

14. A location search auxiliary system used in a cellular radio telephone for locating the mobile telephone, the system comprising:

a main battery to supply operating power to the mobile telephone;

an auxiliary battery;

a search signal receiver for receiving a search signal, and generating an alarm signal upon receiving the search signal;

a power fail detector for detecting a power fail state of the main battery;

a first switch for connecting the auxiliary battery to the search signal receiver to supply power when the power fail state of the main battery is detected;

a second switch for switching the auxiliary battery to an emergency power supply when the search signal is detected; and means for generating an indication of location of the telephone when the alarm signal is generated.

* * * * *